2,954,296

PROCESS FOR PREPARING PUFFED CEREAL PRODUCT

Adolph S. Clausi and Raymond E. Mohlie, Battle Creek, Mich., assignors to General Foods Corporation, White Plains, N.Y., a corporation of Delaware No Drawing. Filed Feb. 13, 1959, Ser. No. 792,987

13 Claims. (Cl. 99—82)

The present invention relates to puffed food products of the ready-to-eat breakfast cereal or snack type produced by so-called gun-puffing methods.

Heretofore, it has been the practice to produce some breakfast-food cereals or snacks from a cooked dough which is formed into pellets and thereafter subjected to heat and a sudden decrease in pressure so that the pellets will expand in size, after which the pellets are dried in their expanded condition. This process has come to be known as gun-puffing. The prior art also describes a process for the manufacture of a porous bakery or food product from an uncooked dough which is formed into pellets and thereafter very carefully dried at low temperatures so as not to disrupt the starch granules or the moisture contained therein. These substantially air dried pellets are then subjected to heat and a differential in pressure so that the pellets will expand in size and assume a porous structure.

In the preparation of ready-to-eat breakfast cereals, both of these techniques have very definite disadvantages and limitations. In addition to objectionable clustering or sticking together of both types of puffed pellets, there are noticeable drawbacks to each process when it is attempted to puff each type of dough piece to a novel shape wherein the outline of each puffed piece is well-defined and resembles closely the original shape of the unpuffed material, e.g., letters of the alphabet, numerals, animal shapes, and other intricate shapes practiced in the macaroni art. More specifically, in the case of pellets formed from cooked dough, shaped and gunpuffed, where a particular shape is desired, this process is applicable only to simpler, more rounded forms such as O shapes; even then the puffed product varies in its degree of puff and shape-definition. A cooked dough is exceedingly difficult to shape into intricate designs having corners, perforations or striations. After shaping, which usually involves extrusion through a dye, it becomes necessary to dry the pellets of cooked dough from fairly high moisture levels to a moisture content suitable for effective gun-puffing. After formation of the pellets and during this drying step, the pellets tend to lose their original shape and round out on their surfaces due to evaporation of moisture and the plastic nature of the cooked dough. Upon subsequent gun-puffing, these puffed dough pellets demonstrate further loss of most of the detail of the original shape.

In the case of an uncooked dough which is formed into pellets and subsequently gun-puffed, although accuracy of shape-definition in most instances appears to be obtainable, the resulting product is not of adequate (i.e., sufficiently low) density and crispness of texture to render it suitable for breakfast cereal use. If temperatures and pressures in gun-puffing are increased in order to obtain the density and texture necessary for breakfast cereal use, the material shatters very badly and so such approaches are not commercially practical. Furthermore, in the case of certain cereal flours such as oat flour, rye flour and barley flour, for example, which do not form tenacious doughs at the moisture levels which must be practiced in gun-puffing, it is practically impossible to obtain any significant expansion from an uncooked dough which is formed into pellets and subsequently gun-puffed.

It has now been found that a low density breakfast cereal or snack product of greatly enlarged size and having a highly acceptable crispy, crunchy eating quality can be produced which faithfully expands from a dough or a dough piece having a well-defined shape to a puffed product closely resembling the original shape of the dough piece by gun-puffing pieces of a moist dough or mixture of doughs wherein part of the starch is gelatinized and part is ungelatinized prior to introduction to the gun-puffing chamber. This is done by employing a moist dough consisting of a mixture of uncooked farinaceous material and pregelatinized starch. The pieces are puffed by subjecting them to heat and high pressure and thereafter suddenly discharging them from a confined area of high pressure to an unconfined area of lower pressure.

One explanation for these improved results is as follows. Thoroughly cooked flours which are subsequently pelletized and gun-puffed, offer little resistance to deformation due to the highly elastic, thoroughly gelatinized condition of the starch. This results in a product wherein the explosive force of gun-puffing tends to leave long irregular voids in the center and compresses the soluble starches against the external walls of the product. This action also serves to round out the external wall of the dough piece in a way much like the way that a rubber balloon is rounded when internal air pressure is developed. This results in a significant loss in sharpness of definition when such is desired; this is particularly true of fairly intricate, square shapes, i.e., letters of the alphabet.

On the other hand, uncooked farinaceous material which is carefully dried so as not to disrupt the starch granules nor the moisture content contained therein, and is subsequently pelletized and gun-puffed, demonstrates very little elasticity in the pellet during the puffing operation. In gun-puffing such pellets there results some explosive action due to the moisture content contained within the individual starch granules. But this explosive action will vary greatly depending upon the nature of the starchy material employed. In the cases of those flours which require greater amounts of moisture to form elastic doughs and/or effect gelatinization, very little expansion as a result of gun-puffing will occur; or, at any rate, not enough to produce a low density puffed dry breakfast cereal product of acceptable eating qualities. However, due to the high resistance to deformation demonstrated by such a dough, a good retention of the original shape will result.

It has been found in the practice of this invention that by the use of small percentages of pregelatinized starch-containing materials along with uncooked farinaceous material there is provided a dough that demonstrates enough elasticity such that when subjected to puffing pressures, adequate expansion takes place to give a highly desirable low density dry breakfast cereal. Coincident with this expansion, the uncooked farinaceous phase offers enough resistance to deformation so that although the expansion takes place, the bulk of the cereal component will not be pressed against the outer surfaces leaving voids in the center and resulting in a rounding effect of the outer surface. Instead, the pregelatinized phase forms an elastic matrix which allows for the degree of expansion necessary while the bulk of the originally uncooked farinaceous material distributes itself quite uniformly throughout the matrix, resulting in a uniform vesicular structure throughout the puff.

The pregelatinized starch-containing material used in the present process should therefore have a substantial cohesiveness and elasticity and should preferably be a waxy-type of starch or one which has been modified to possess the properties of a waxy-type starch. In carrying out the process of this invention any conventional cereal flour or meal or cereal starch such as those of wheat (hard or soft), corn, tapioca, oat, barley, rye and the like, can be employed as the uncooked-dough-forming farinaceous constituents. The pregelatinized starch either separated from or still combined with the other constituents of the farinaceous material which provides the selected starch can be any cereal or tuber-type of starch. Among the preferred types of pregelatinized starches are pregelatinized corn, waxy maize, tapioca and potato. The more preferred types of starch are pregelatinized corn starch and waxy maize.

The pregelatinized starch-containing material will constitute a minor percentage by weight of the total of the farinaceous material and the pregelatinized starch. Depending upon the variety of the pregelatinized starch and its condition either in a separate state or as part of a flour, this percentage will be found to vary between 5% and 50%; where pregelatinized flours are used rather than pregelatinized starches a higher percentage of pregelatinized material is usually required, which percentage is generally less than 50% of the total weight of the farinaceous material and will range between about 15–50% by weight. Where the pregelatinized starch is employed as such rather than as part of a flour the percentage of a pregelatinized starch by weight of the total farinaceous ingredients will generally vary between about 5–30%. In general, in the case of waxy-type pregelatinized starches such as waxy maize, tapioca, potato and other non-waxy starches which have been modified through various means known to the art to exhibit characteristics of these waxy-type starches, such as corn starch, lower quantities of the pregelatinized starch are required than in the case of the non-waxy-types of pregelatinized starches. When oat flour, viz., ground oat groats, is used as the farinaceous material, it is preferred to employ in the order of five to twenty percent of pregelatinized waxy maize, tapioca, potato starch or corn starch which has been modified to exhibit the properties of a waxy starch. The level of pregelatinized starch desirably employed will depend to some extent on the type of uncooked farinaceous material used. For example, where wheat flour is employed, a generally lower level of pregelatinized starch is called for than in a dough-containing oat flour. In general, those uncooked farinaceous materials demonstrating poor cold dough-forming properties will make greater demands on the type and quantity of pregelatinized starch required. In addition, the pregelatinized starch should not be present at a level whereat the dough pieces containing it are sticky or gummy and thereby hinder the efficacy of the dough-forming and puffing process through rounding of the edges, clustering and loss of shape-definition generally in the gun-puffing chamber. Appropriate ranges of operability for the various pregelatinized starches and pregelatizined flours that have been used with raw or uncooked flours are as follows:

| | Percent |
|---|---|
| Pregelatinized waxy maize starch | 5 to 15 |
| Pregelatinized tapioca starch | 5 to 15 |
| Pregelatinized potato starch | 10 to 20 |
| Pregelatinized modified cornstarch | 10 to 20 |
| Pregelatinized corn flour | 15 to 40 |
| Pregelatinized rice flour | 10 to 30 |
| Pregelatinized wheat flour | 30 to 50 |
| Pregelatinized oat flour | 30 to 50 |

These ranges will vary with the characteristics of the ungelatinized farinaceous materials to which they are added.

The gun-puffed product of this invention is characterized by extreme faithfulness in expansion from the original shape of the dough piece, and therefore the puffed product closely resembles the original shape of the extruded dough. The pieces are puffed to a volume five to six times larger than that of the original pellets, their expansion being equal to or greater than that of gun-puffed breakfast cereals prepared from uncooked dough pieces or cooked dough pieces. The character of the dough prepared from a mixture of uncooked farinaceous material and pregelatinized starch is such that the novel and intricate product shapes obtainable are numerous and varied and are all substantially compatible with gun-puffing operations; the shapes are limited only by the ability of the dough-forming equipment to produce them.

The texture of the present puffed product, a factor bearing upon its eating quality when consumed dry or with milk or cream, contributes to providing a highly acceptable breakfast cereal or snack. The gun-puffed product is structurally different from any gun-puffed breakfast cereal now on the market and manufactured from thoroughly cooked dough. The product of the present process has a fairly uniform cellular structure, the cavities between the cell walls being quite regular in size and distribution. This is in contrast with commercially available gun-puffed dough products which have hard outer surfaces and irregular vesicular structures. The product of this invention possesses a more uniform vesicular internal structure and a comparatively softer external shell than gun-puffed products made from thoroughly cooked doughs. Despite this, the structural strength of the present product, i.e., its resistance to deformation forces without crumbling, is high; the product will eventually yield to compression, but even than is relatively free of crumbling. After continued compression, the product will eventually crumble into smaller pieces. Due to the strength of the cell walls and the size and distribution of the cell wall cavities, the product offers a high resistance to chewing and will not quickly decompose on hydration in milk or cream to a mushy condition. When dry, the product usually can be snapped with a crackling noise. The gun-puffed product is palatable when eaten with or without sugar and the savory taste of a sweetened farinaceous material such as oat flour prevails. A gun-puffed product from pellets which are dried prior to gun-puffing slowly at low temperatures, typically in the neighborhood of 200° F., exhibit extreme sharpness of definition. This is desirable in some cases but in others where extreme sharp corners, edges and angles do not offer a pleasing mouth-feel a pellet drying temperature of 300° F. is employed prior to gun-puffing; at drying temperatures above 200° F. and below the temperature at which scorching will occur a slight rounding of corners and edges occurs due to swelling of the dough pellets in the dough dryer and for many products this provides a more pleasing texture and mouth feel in the gun-puffed product. It should be noted, however, that this rounding and swelling does not begin to approach that experienced with gun-puffing a totally cooked dough pellet and shape definition is not destroyed by such rounding and swelling. In general the drying should be carried out for a length of time at such temperatures commensurate with the desired sharpness of shape definition.

The present process is characterized by the use of less water in preparing the dough than is the case when a cooked dough is prepared for gun-puffing. In the latter instance it is customary to add about equal parts of water by weight (or more) to the dry materials to form the dough and to supply adequate moisture for thorough gelatinization of the starch components. In the present process much less water, viz., less than 50% by weight of the dough, is required. This permits a considerable saving in commercial drying equipment and process time, since it is also necessary to reduce the moisture content in a shaped dough piece to a very low order so that it may be gun-puffed properly. Equipment for cooking the dough is also unnecessary. In addition, the present dough is of high plasticity though low in moisture and, hence, is much more readily extrudable in conventional forming or shaping equipment and allows the utilization of macaroni extruding equipment in the process. In attempting to extrude a cooked dough, the task of forming or shaping the dough into the desired shape is much more difficult due to the tough, rubbery character of the dough and the tendency for edges of the dough shape to "round out."

The pregelatinized starch or starch-containing material may be combined in the dough with the other uncooked farinaceous materials in a number of ways. The pregelatinized starch can be dry blended with the uncooked flour or starch, or the pregelatinized starch can be added to a dough prepared from the uncooked farinaceous material in the process of kneading it. Then again the pregelatinized starch can be dispersed in a quantity of water and added to the other dry ingredients or to the dough prepared therefrom. Also, starch may be added to a quantity of water and cooked to gelatinize it after which the thus cooked starch can be combined with the other farinaceous uncooked materials to prepare the dough.

The first step in the process preferably comprises the combination of the water or other aqueous liquid with uncooked farinaceous material such as flour or starch and dry pregelatinized starch, the distribution of the water throughout the farinaceous material and the pregelatinized starch being affected by simple stirring or other mixing usually for a period of about five minutes in order to get sufficient elasticity and dough-like consistency needed for subsequent shaping and puffing. In this connection, the amount of moisture needed in the dough is in the order of 20%–45%. The amount of moisture present in the dough will vary for various farinaceous materials and pregelatinized starches, the only criteria being one of sufficient moisture to obtain the desired elastic dough mass capable of being extruded and thereby shaped into dough pieces. After this initial mixing step, the material must then be kneaded to effect thorough homogeneity. In certain dough shaping equipment, kneading occurs during the extruding operation whereas in others it may be required to separately knead the mass for a sufficient period of time in the order of five to ten minutes. Commercial equipment permitting simultaneous mixing of aqueous liquid with the farinaceous material and pregelatinized starch and kneading is illustrated by the Baker-Perkins mixer or any other of the kneading devices employed in commercial bakeries, macaroni factories, and the like. An illustration of the type of kneader employed in the macaroni industry is shown in "Macaroni Product," J. A. Le Clerc, Cereal Chemistry, volume 10, pages 383–419 (1933).

The dough is then shaped to whatever form is desired. This may be the tubular macaroni shape, the shell macaroni shape or, more preferred, the materials may be formed into various letters of the alphabet or into numerals. The equipment for this purpose is also shown in the aforementioned article by Le Clerc. In this latter connection, a die having a cross section of the desired shape is employed in conjunction with a knife which cuts off the form as it emerges and in this manner forms a letter, number or other shape.

As indicated above, particular care in the formation of the shape of the unpuffed dough pieces is amply justified because the method of the present invention provides a faithful reproduction on puffing of whatever shape the unpuffed dough is formed into.

After forming the dough, drying to below 15% moisture should be accomplished prior to puffing. This may be carried out in any conventional manner using a forced draft dryer from the standpoint of greater efficiency of drying, a temperature of about 300° F. being satisfactory and a period of about two to ten minutes being adequate. Other conditions of drying may be required depending upon the drying equipment, the nature of the uncooked farinaceous material and the pregelatinized starch employed, and the dimensions and shapes of the dough pieces formed. Also it might be desirable in some cases to prepare a dough containing greater amounts of moisture than those indicated above which, of course, would require a longer drying period.

In any event, the drying should be carried to a point where the moisture content of the dough pieces is within the range of about 3–15%. Below 3% there is insufficient moisture to provide the desired degree of puffing. However, some degree of puffing will be obtained at such low moisture levels, i.e., below 3%, but this is not preferred in making a low density puffed breakfast cereal product. In any event, a moisture content of at least about 3% is required in order that the pieces will have sufficient moisture to permit gun-puffing to produce a product shape several times its original size. On the other hand, above 15% moisture excessive clustering or clumping will be experienced in the puffing gun because of the stickiness of the pieces. Moreover, the highest possible degree of puffing and faithful reproduction of shapes is not obtained at higher moisture contents.

The dried dough pieces are then placed in a gun-puffing apparatus of any suitable type such as a batch gun puffer of the barrel type. Preferably the shaped pieces are held in the gun for a period of time to result in equalization of moisture content throughout their mass. This may be done by preheating the pieces for four minutes by applying an open gas flame to the outside of the barrel which provides a temperature of about 400° F. within the gun. In any event, the pieces should be elevated to a sufficient temperature where, upon subsequent introduction of steam into the gun-puffing chamber, steam will not be condensed and thereafter impair gun-puffing efficiency. Preferably, the dry dough pieces prior to introduction of steam into the puffing chamber should have a temperature above 250° F. and ranging from that temperature to about 300° F. At temperatures substantially above this latter temperature, scorching will be encountered. Thereafter, superheated steam at about 150–175 lbs. per square inch (gauge) is introduced over a period of 20–45 seconds, and the pressure is then suddenly released to normal atmospheric conditions to effect expansion of the dough shapes. Superheated steam is generally introduced to the chamber at a temperature of 375°–450° F. The holding time in the puffing gun will vary with the degree of expansion desired. Where gun-puffing by sudden release to atmospheric pressure is employed, the holding time in the chamber will vary from 20–45 seconds to obtain a breakfast cereal type of product.

After puffing, the expanded product usually contains about 2–6% moisture and generally it will be found that it should be dried further to 1–2% moisture from the standpoint of maximum palatability and appeal. Also, the product is usually toasted, which can be most conveniently effected in the drying operation.

In the present process an extruded dough shape having a sharply defined corner, crevice or perforation will substantially retain this shape in its expanded state and at the same time will assume the textural characteristics preferred for low density, palatable, ready-to-eat breakfast cereals. The degree of puffing will be in the order of five times the original volume of the dough piece; in other words, the original density of the dough piece will be reduced about five times.

With respect to the texture of products prepared from specific cereal grains, in the case of the gun-puffed product, wherein the dough piece contains wheat flour and a pregelatinized starch-containing material, the product offers a crispy, crunchy mouth feel and upon hydration in milk, though it softens, it does not become rubbery or tough. In the case of oat, corn and rice flour puffed from the dough containing a pregelatinized starch, the product is quite crispy and crunchy and retains its crispness in milk for a long period and does not quickly become mushy or rubbery. Collateral with these improvements in the textural characteristics of gun-puffed food products is a reduced frequency of shattering and crumbling during gun-puffing and later handling resulting in an improved product yield and appearance.

Detailed examples of the process of the present invention are set forth below:

*Example 1*

8.5 lbs. of ground whole oat groats are mixed with 1.5 lbs. pregelatinized oxidized corn starch and combined with 5 lbs. of water in a Baker-Perkins mixer for a period of about 5 minutes to accomplish mixing and kneading. Suitable vitamins, minerals and coloring may be included in the dough as well as sugar and salt. This provides a dough containing approximately 35% moisture. This dough is then extruded or otherwise formed into any desired shape. It is formed into X shapes by extruding it through a die having an X cross section and cutting off the extrudate with revolving knife blades as it emerges to provide the shapes. The shapes are then placed on a foraminous conveyor and dried in a forced draft dryer at 300° F., using an air velocity of about 300 linear feet per minute, down draft, for three minutes, the bed thickness being about ¼ inch. After drying the shapes are at a moisture content of about 10%.

A puffing gun comprising a cylinder about 9 inches in diameter and 24 inches long is charged with about 5 lbs. of the aforementioned dried shapes. The gun is then closed and the cylinder is revolved about its longitudinal axis while heating with an open gas flame along the length of said axis. This is continued for about 4 minutes during which time the temperature of the shaped pellets within the gun reaches about 275° F. After the aforementioned period of 4 minutes, steam superheated at about 400° F. is introduced, the pressure of the steam being about 150-175 lbs. per sq. in. (gauge), which pressure is almost instantaneously obtained with the gun upon the introduction of the steam. After holding the material at this elevated pressure for about 20-45 seconds, the steam valve is shut and the gun is fired in the conventional manner releasing the pressure instantaneously to atmospheric conditions and effecting expansion of the dough pieces. The product is puffed to about 5 times its original volume; has a crispy, crunchy texture; and substantially retains the original shape of the dough piece.

The moisture content of the puffed product is about 4% so that further drying is employed to reduce the moisture content to about 2%. This is accomplished by using the forced air dryer mentioned above at the same temperature for 5 minutes. If toasting is desired, the drying and toasting may be effected simultaneously using said forced draft dryer at higher temperatures or open gas flames at 500°-600° F. This requires a period of time of about two minutes. The product provides a crispy, crunchy mouth feel and does not quickly become mushy or rubbery in milk or cream.

*Example 2*

Nine pounds of ground whole oat groats are mixed with one pound of pregelatinized waxy maize starch and combined with five pounds of water in a Baker-Perkins mixer for a period of about five minutes to accomplish mixing and kneading. After the mixing and kneading step, the process is the same that is described in Example 1. The product provides a crispy, crunchy mouth feel and does not quickly become mushy or rubbery in milk or cream.

*Example 3*

9.5 lbs. of ground whole wheat (soft red) is mixed with 0.5 lb. of pregelatinized corn starch or with 0.5 lb. of pregelatinized waxy maize starch combined with 5 lbs. of water in a Baker-Perkins mixer for a period of about five minutes to accomplish mixing and kneading. After the mixing and kneading operation, the process is the same as that of Example 1. The product offers a crispy, crunchy mouth feel and upon hydration in milk, though it softens, it does not become rubbery or tough.

*Example 4*

5 lbs. of corn flour is mixed with 1.5 lbs. of pregelatinized corn starch or with 1.5 lbs. of pregelatinized waxy maize starch and combined with 5 lbs. of water in a Baker-Perkins mixer for a period of about 5 minutes to accomplish mixing and kneading. After the mixing and kneading step, the process is the same as that described in Example 1. The product provides a crispy, crunchy mouth feel and does not quickly become mushy or rubbery in milk or cream.

*Example 5*

7.5 lbs. of ground whole oat groats and 2.5 lbs. pregelatinized corn flour are mixed with 6 lbs. of water. Subsequent processing is the same as described in Example 1.

*Example 6*

8 lbs. of whole wheat flour and 2 lbs. of pregelatinized rice flour are mixed with 5 lbs. of water. Subsequent processing is the same as described in Example 1.

*Example 7*

2 lbs. whole wheat flour, 2 lbs. corn flour, 2 lbs. oat flour, 2 lbs. rice flour, and 2 lbs. pregelatinized wheat flour are mixed with 5 lbs. of water. Subsequent processing is the same as described in Example 1.

*Example 8*

6 lbs. rice flour, 1 lb. defatted soy flour, 1 lb. of wheat gluten, ½ lb. dried skimmed milk, ½ pound wheat germ, and 1.5 lbs. pregelatinized cornstarch are mixed with 6 lbs. of water. Subsequent processing is the same as described in Example 1.

Although one specific gun-puffing operation has been described in detail in the specific example given, gun-puffing may be achieved by other means than that by puffing to atmospheric pressure; thus a dough piece containing pregelatinized starch-containing material and uncooked farinaceous material may be puffed by releasing shaped dough pieces from a puffing chamber to a subatmospheric pressure. Where it is desired to gun-puff by sudden release to subatmospheric pressure approximately the same technique may be employed as in puffing to atmosphere except that steam pressure in the gun is usually much lower. For example, in puffing to subatmospheric pressure a pressure in the puffing chamber of 80 p.s.i.g. to 90 p.s.i.g. normally results in about the same degree of product expansion as when a pressure of 175 p.s.i.g. is used in puffing to atmosphere Likewise, it is contemplated as being within the scope of the present invention to incorporate flavoring materials, sugar, salt, malt, vanilla, and the like, at any stage in the process, such as when the dough is being kneaded or after the product has been puffed and dried. Also, the product may be colored. The preferred way to color the product is by incorporating the dye while the dough is being mixed or kneaded or by spraying a solution of dye into the shapes before puffing, or if desired, after puffing and before the final drying period. Also, a candy coating may be applied using any well known techniques of applying a hard candy such as that shown in U.S. Patent No. 2,333,442, or by the application of a syrup as is shown in U. S. Patent No. 2,196,304.

This application is a continuation-in-part of application Serial No. 644,712, filed March 8, 1957, for Food Product and Process, by the same inventors, now abandoned.

While the present invention has been described with particular reference to specific examples, it is not to be limited thereby, but reference is to be had to the appended claims for a definition of its scope.

What is claimed is:

1. A process of preparing a puffed ready-to-eat food product which comprises preparing a moist kneaded dough of farinaceous material having sufficient moisture to permit shaping into well defined shapes and containing a majority of starch-containing material wherein the starch is ungelatinized and a minority of starch-containing material wherein the starch is present at 5–30% of the farinaceous material and is gelatinized, forming said dough into pieces having well defined shapes, drying said pieces to a moisture content of at least 3% and high enough to permit gun-puffing to produce a product shape several times its original size, said moisture content being below 15% by weight of the dough pieces, and then puffing the pieces by subjecting them while at a temperature above that at which steam condenses to heat and high pressure for a period sufficient to develop positive steam pressure and suddenly discharging them to an area of lower pressure, the pieces being puffed to provide crunchy cellular products several times larger than their original shape while being a faithful reproduction of said original shape.

2. A process of preparing a puffed, ready-to-eat food product which comprises preparing a moist kneaded dough of farinaceous material having sufficient moisture to permit shaping into well defined shapes and containing a majority of starch-containing material wherein the starch is ungelatinized and a minority of starch-containing material wherein the starch is present at 5–30% of the farinaceous material and is gelatinized, forming said dough into pieces having well defined shapes, drying said pieces to a moisture content of at least 3% and high enough to permit gun-puffing to produce a product shape several times its original size, said moisture content being below 15% by weight of the dough pieces, and then puffing the pieces by subjecting them while at a temperature above that at which steam condenses to heat and high pressure for a period sufficient to develop positive steam pressure and suddenly discharging them to the atmosphere, the pieces being puffed to provide crunchy cellular products several times larger than their original shape while being a faithful reproduction of said original shape.

3. A process of preparing a puffed, read-to-eat breakfast cereal product which comprises preparing a moist dough of uncooked farinaceous material and 5–30% pregelatinized starch, said dough having a moisture content within the range of about 20–45%, forming said dough into pieces having well defined shapes drying said pieces to a moisture content of at least 3% and high enough to permit gun-puffing to produce a product shape several times its original size but not above 15%, and then puffing the pieces by subjecting them while at a temperature above that at which steam condenses to heat and high pressure for a period sufficient to develop positive steam pressure and suddenly discharging them from an area of higher pressure to an area of lower pressure, the pieces being puffed to provide crunchy cellular products several times larger than their original shape while being a faithful reproduction of said original shape.

4. A process of preparing a puffed, ready-to-eat breakfast cereal product which comprises preparing a moist dough of uncooked farinaceous material and 5–30% pregelatinized starch, said dough having a moisture content within the range of about 20–45%, forming said dough into pieces having well defined shapes, drying said pieces to a moisture content within the range of about 3–15%, and then puffing the pieces by subjecting them while at a temperature above that at which steam condenses to heat and high pressure for a period sufficient to develop positive steam pressure and suddenly discharging them from an area of higher pressure to the atmosphere, the pieces being puffed to provide crunchy cellular products several times larger than their original shape while being a faithful reproduction of said original shape.

5. The process of claim 4 in which the pellets are dried at a temperature about 300° F.

6. The process of claim 4 in which the pregelatinized starch has a substantial water binding capacity.

7. The process of claim 4 in which pregelatinized starch is corn starch.

8. The process of claim 4 in which the pregelatinized starch is waxy maize starch.

9. The process of claim 4 in which the pregelatinized starch is tapioca starch.

10. The process of claim 4 in which the pregelatinized starch is potato starch.

11. The process of claim 4 in which the pregelatinized starch has a substantial water binding capacity and the farinaceous material is oat flour.

12. The process of claim 4 in which the pregelatinized starch is oxidized corn starch and the farinaceous material is oat flour.

13. A process of preparing a puffed, ready-to-eat breakfast cereal product which comprises preparing a moist dough of a majority by weight of uncooked oat flour and 15–30% pregelatinized starch, said dough having a moisture content within the range of about 20–45%, forming said dough into pieces having well defined shapes, drying said pieces to a moisture content within the range of 3–15%, and then puffing the pieces by subjecting them in a confined area to superheated steam at a temperature of 375°–450° F. and a pressure of about 150–175 lbs. per sq. in. (gauge) and suddenly discharging them from said confined area to the atmosphere, the pieces being puffed to provide crunchy cellular products several times larger than their original shape while being a faithful reproduction of said original shape.

References Cited in the file of this patent

UNITED STATES PATENTS

| | | |
|---|---|---|
| 874,279 | Anderson | Dec. 17, 1907 |
| 2,162,376 | Collatz | June 13, 1939 |
| 2,526,792 | Alderman | Oct. 24, 1950 |

FOREIGN PATENTS

| | | |
|---|---|---|
| 26,792 | Australia | May 19, 1930 |